United States Patent [19]

Nowicki

[11] Patent Number: 4,595,449
[45] Date of Patent: Jun. 17, 1986

[54] LABELS TO BLOW MOLDED ARTICLES

[75] Inventor: Casimir W. Nowicki, Sylvania, Ohio

[73] Assignee: Owens-Illinois, Inc., Toledo, Ohio

[21] Appl. No.: 739,837

[22] Filed: May 31, 1985

Related U.S. Application Data

[62] Division of Ser. No. 570,059, Jan. 12, 1984, abandoned.

[51] Int. Cl.$^4$ .................... B65C 9/28; B32B 31/00; B28B 21/36; B29C 5/06
[52] U.S. Cl. .................. 156/444; 156/443; 156/476; 156/497; 156/500; 156/539; 156/150; 264/516; 425/503; 425/519; 425/522
[58] Field of Search ............... 156/381, 444, 443, 476, 156/475, 497, 500, 502, 539, 556, 557, 560, 582, DIG. 38, DIG. 18, 218, 228, 156, 232, 245, 285, 240; 264/509, 516, 573

[56] References Cited

U.S. PATENT DOCUMENTS

| | | | |
|---|---|---|---|
| 2,661,109 | 12/1953 | Gerhardt | 156/496 |
| 2,946,472 | 7/1960 | Carter | 156/560 |
| 3,206,347 | 9/1965 | Holstein | 156/476 |
| 3,324,508 | 6/1967 | Dickinson | 264/509 |
| 3,536,560 | 10/1970 | Della Vita et al. | 156/560 |
| 3,884,746 | 5/1975 | Löliger et al. | 156/497 |
| 4,115,179 | 9/1978 | Carter | 156/497 |
| 4,397,625 | 8/1983 | Hellmer et al. | 264/509 |

Primary Examiner—Edward Kimlin
Assistant Examiner—L. Falasco
Attorney, Agent, or Firm—Philip M. Rice

[57] ABSTRACT

In the forming of an article by blow molding a parison into conformity with a cavity defined by a partible a method and apparatus which comprises positioning a label of flexible material on each section of the mold, each label having a width in a circumferential direction such that a portion of one axial edge of each label extends beyond the side edge of the cavity forming portions of the section of the mold and the other axial edge, moving the mold sections toward one another so that they close and define the mold cavity, deflecting the edge of each label radially inwardly before the molds close such that as the molds close the deflected edge will overlap with an adjacent edge of the adjacent label, and blowing the parison into conformity with the cavity such that the edges of the two labels overlap and register to define a continuous label about the article.

16 Claims, 12 Drawing Figures

LABELS TO BLOW MOLDED ARTICLES

This is a divisional of co-pending application Ser. No. 570,059 filed on Jan. 12, 1984, now abandoned.

This invention relates to the application of labels and particularly to the application of labels to hollow blown plastic articles.

BACKGROUND AND SUMMARY OF THE INVENTION

In the making of hollow blown articles such as containers from plastic material, it has heretofore been suggested that labels be held in the mold sections by vacuum so that when the parison is blown outwardly into conformity with the cavity, the label becomes adhered or bonded to the article. A problem that has resulted in such application of labels is that there is a tendency for the plastic material to distort and deform non-uniformly in any space between the edges of the labels or where the edges of the labels abut one another.

Accordingly, among the objects of the present invention are to provide a method and apparatus for applying a label to a plastic article while it is being formed by blow molding which will result in a uniform appearance of the article and at the same time will obviate any distortion or non-uniformity in the plastic. A further object of the invention is to provide a novel blown plastic article having a label.

In accordance with the invention, the method and apparatus of forming an article by blow molding a parison into conformity with a cavity defined by a partible mold, comprises positioning a label of flexible material on each section of the mold, each label having a width in a circumferential direction such that a portion of one axial edge of each label extends beyond the side edge of the cavity forming portions of the section of the mold and the other axial edge, moving the mold sections toward one another so that they close and define the mold cavity, deflecting said one edge of each label radially inwardly before the molds close such that as the molds close the deflected edge will overlap with the adjacent edge of the adjacent label, and blowing the parison into conformity with the cavity such that the edges of the two labels overlap and register to define a continuous label about the article.

DESCRIPTION

Figure 1:
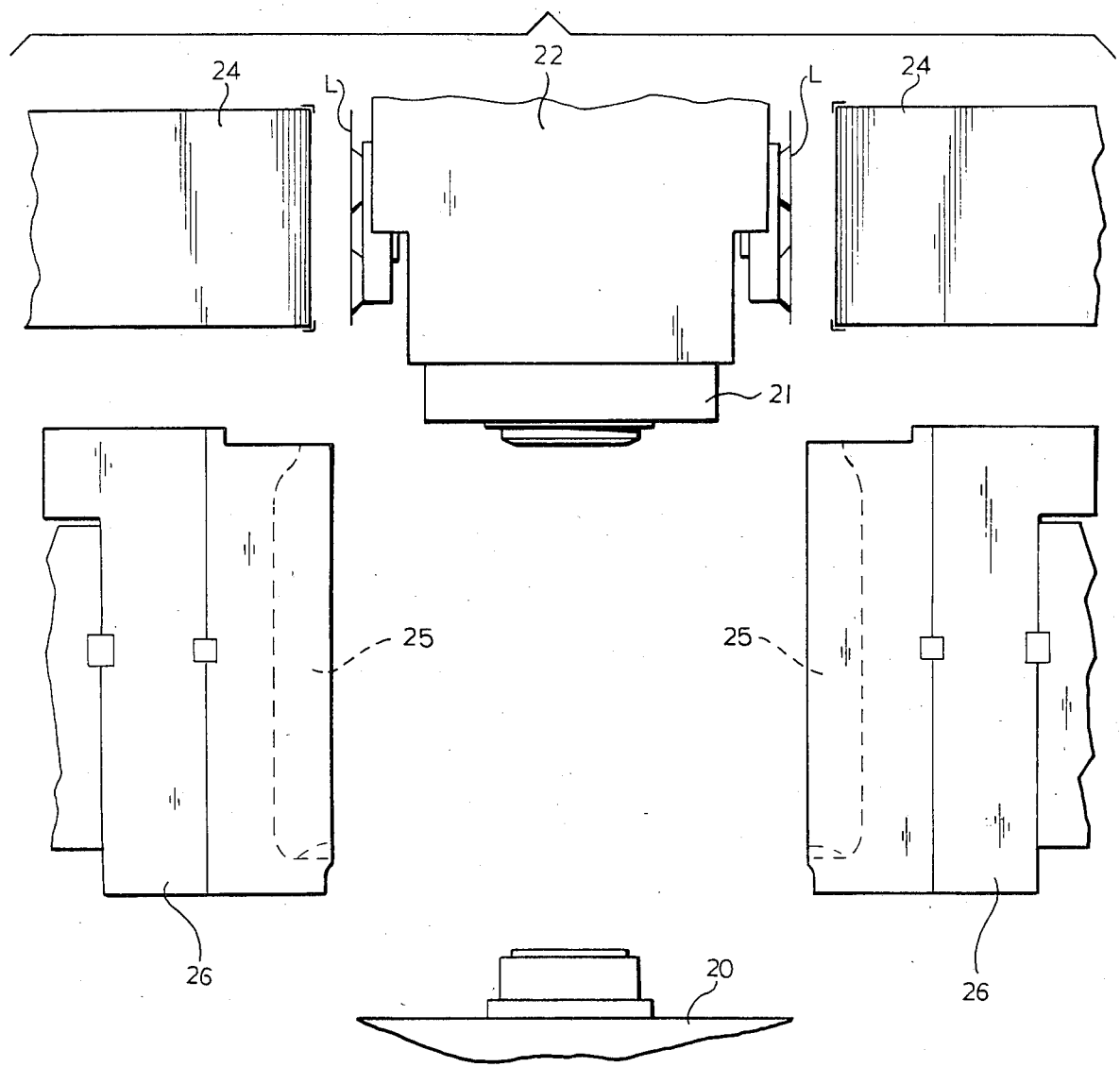
FIGS. 1–4 are partly diagrammatic views of a blow molding apparatus utilized in the invention.
Figure 2:
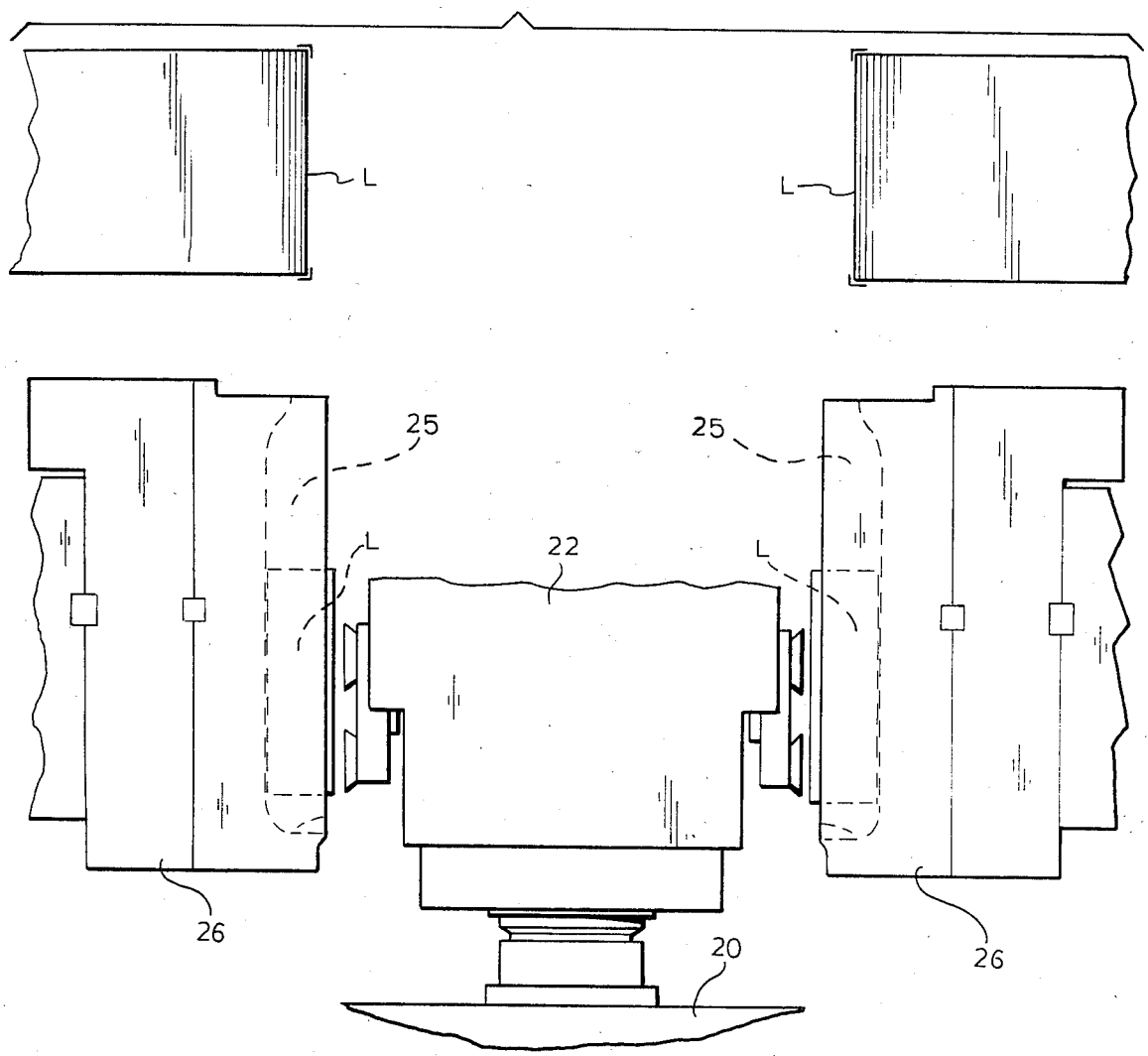

Referring to FIGS. 1–4, the invention relates to a blow molding method and apparatus wherein labels are applied to sections of a mold and the mold sections are closed and a heated parison is blown outwardly into conformity with the mold sections causing the labels to be adhered or bonded to the blown article.

In one type of apparatus as shown in FIGS. 1–4, commonly known as an injection-blow apparatus, a parison in the form of a tube is extruded from an extruder 20 into a neck mold 21 of a head 22. The head 22 includes label handling vacuum devices 23 which remove labels from magazines 24 and deposit the labels on cavities 25 of mold sections 26.

Figure 3:
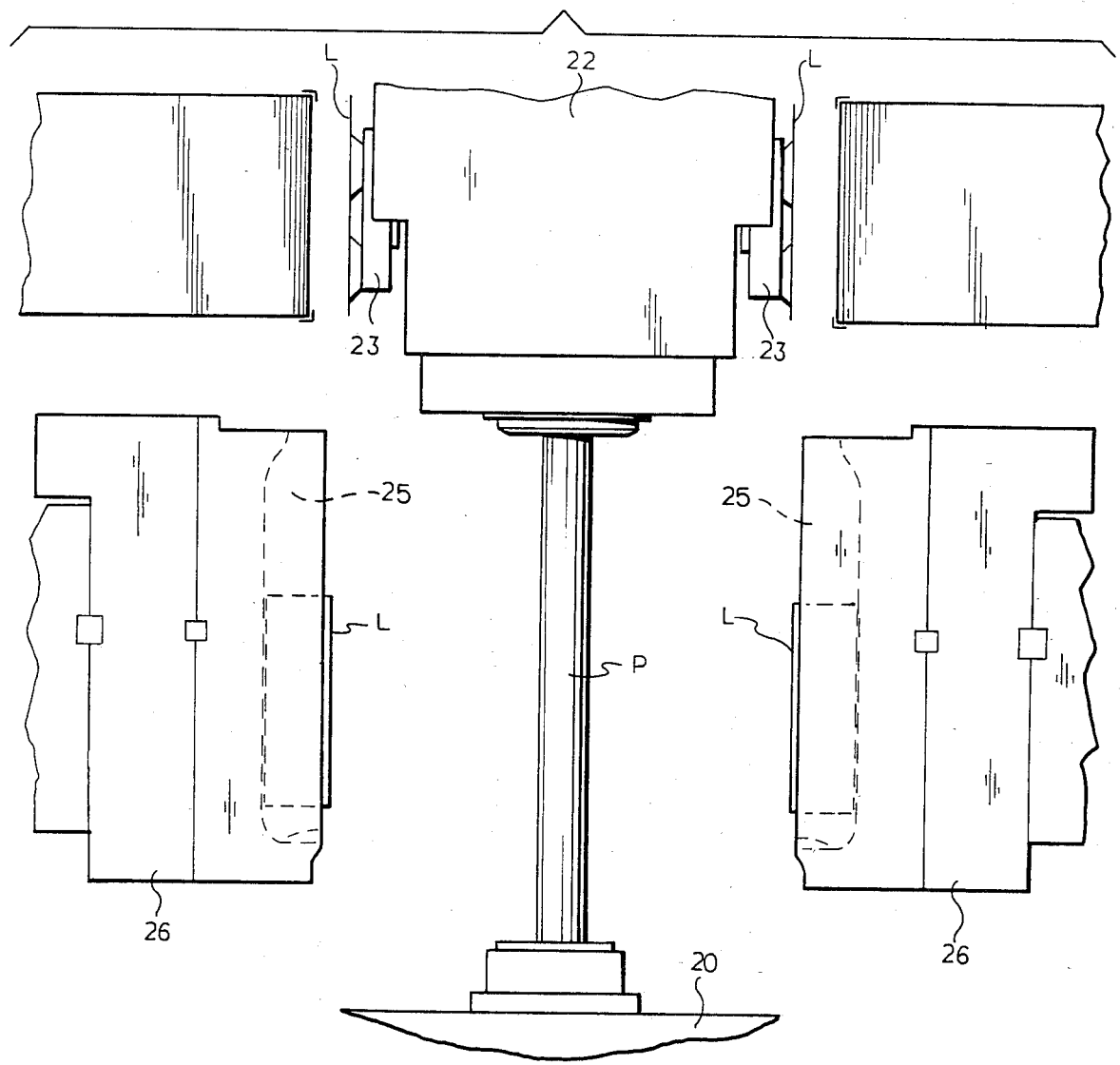
Figure 4:
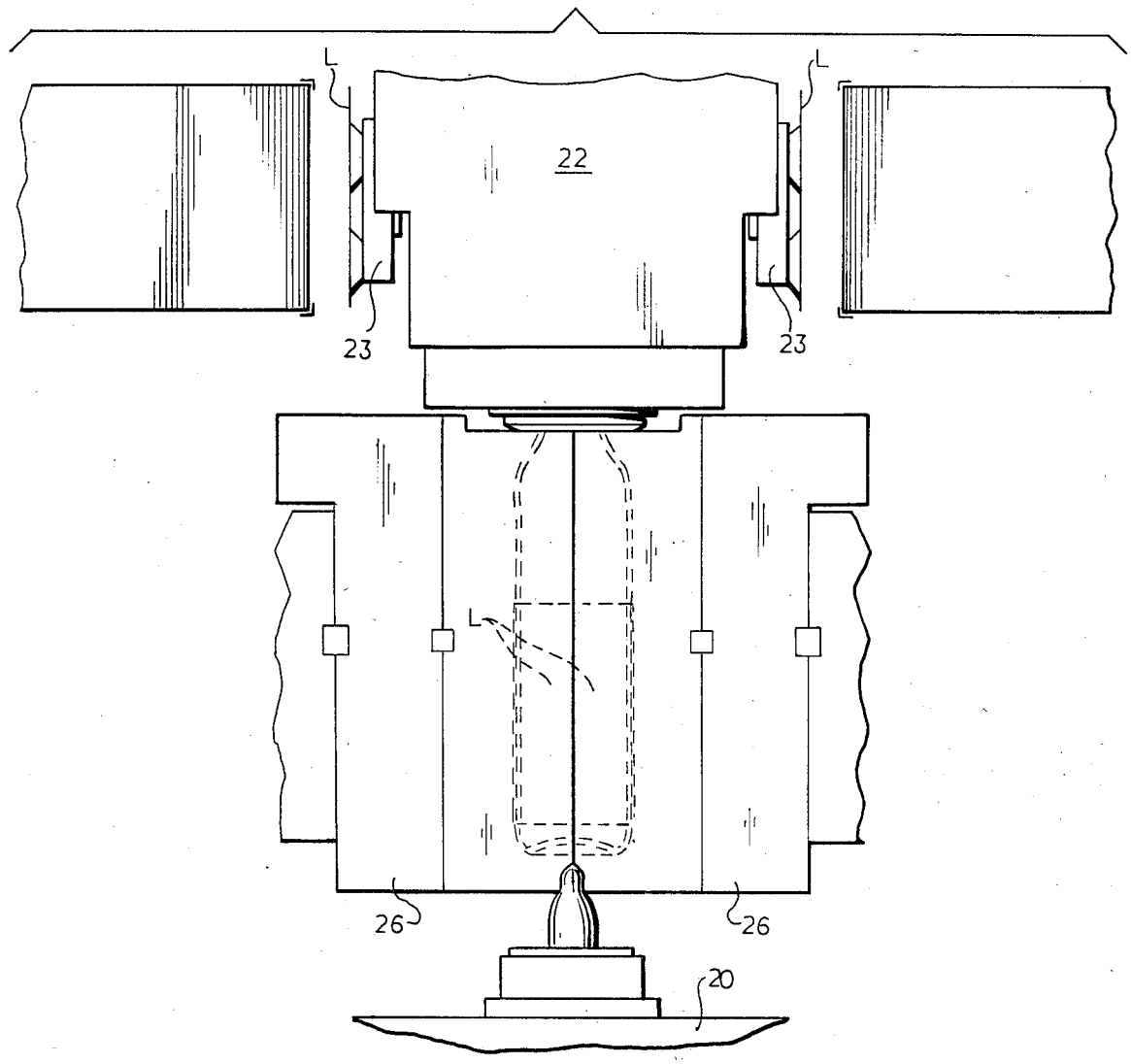

As shown in FIG. 1, in an initial position the head 22 is moved adjacent the label magazine 24 and the applicators 23 are moved outwardly to pick up labels L by vacuum. The head 22 is then moved downwardly to the position shown in FIG. 2, wherein the neck mold 21 is provided adjacent the extruder 20 to inject the neck of the parison. At the same time each label applicator 23 is moved transversely to deposit a label L on the cavity 25 of each mold section 26. The extrusion continues as shown in FIG. 3 and the head 22 moves upwardly to define the parison P. The mold sections 26 are then closed about the parison and the parison is blown outwardly causing the labels to be adhered or bonded to the parison.

Figure 5:
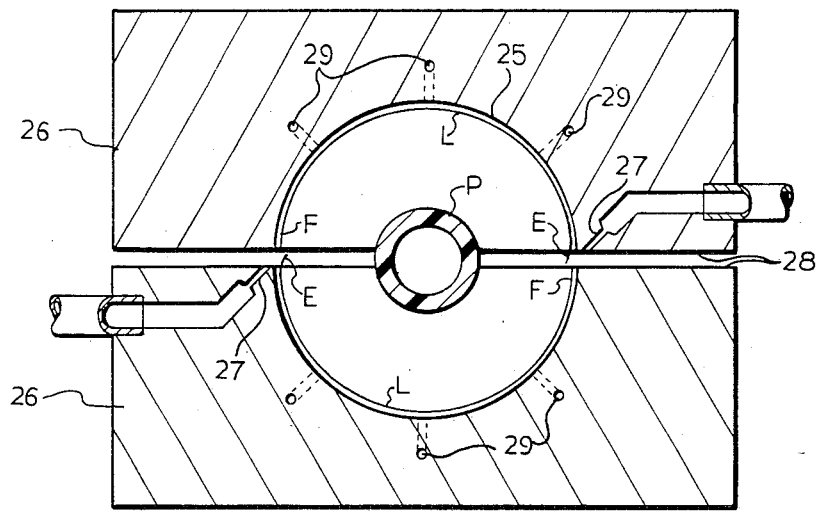
FIG. 5 is a transverse sectional view through a pair of molds in accordance with the invention.
Figure 6:
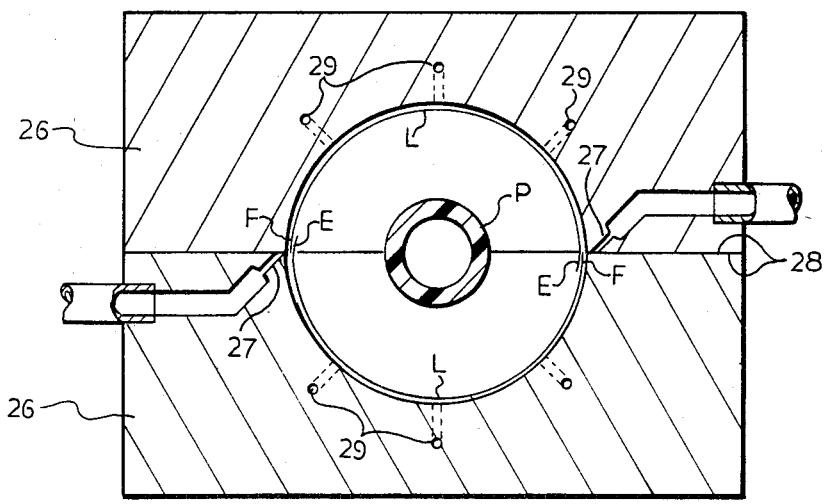
FIG. 6 is a view similar to FIG. 5 showing the molds in closed position.
Figure 7:
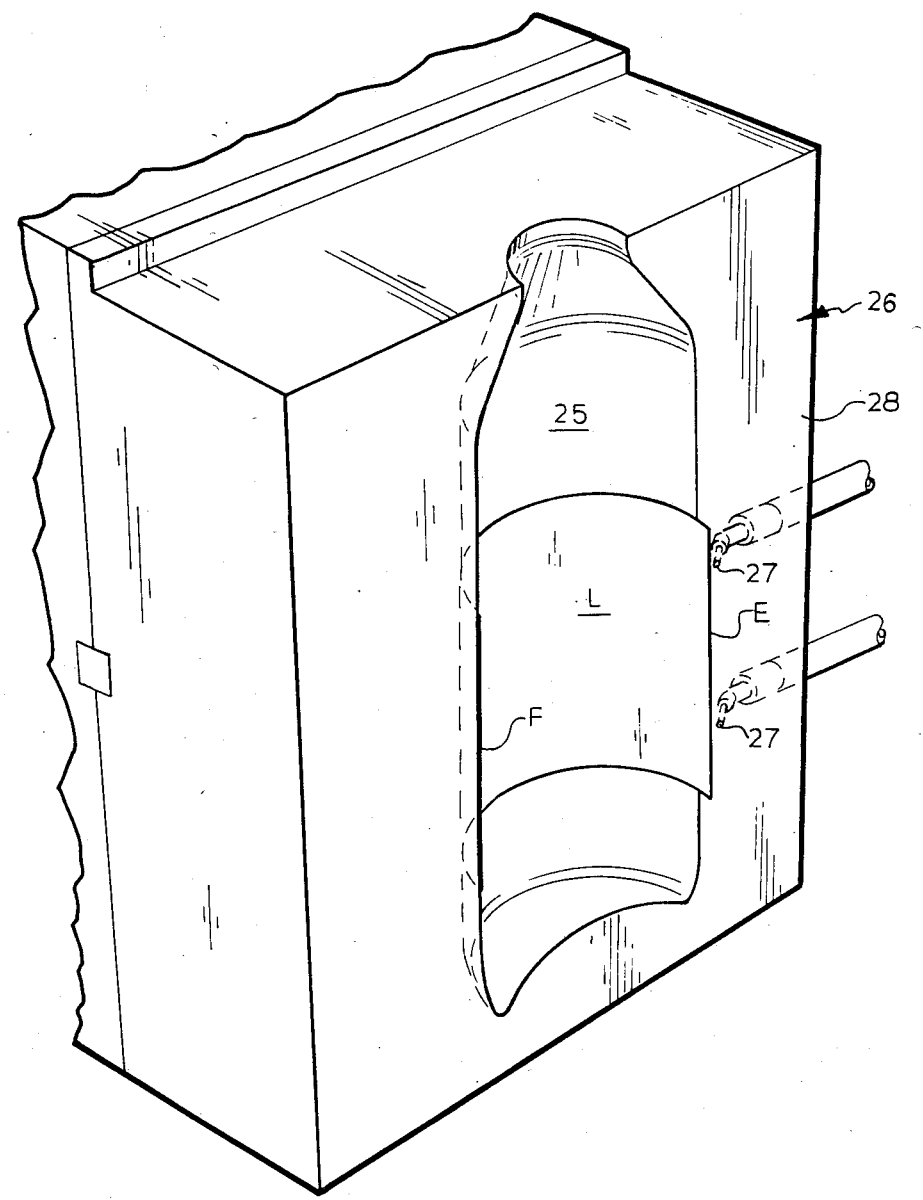
FIG. 7 is a perspective view of a section of a mold.

In accordance with the invention, as shown in FIGS. 5–7 each label L has a circumferential dimension such that one edge E extends beyond the confines of the cavity while the other edge F terminates at the edge of the cavity 25. In addition each mold section is provided with longitudinally spaced orifices 27 which have their ends terminating in the abutting surface 28 of the mold section for directing air jets under pressure against the edge E of label L to fold the edge E radially inwardly. The direction of the jets is at an angle to a radial plane. Each mold section 26 includes vacuum openings 29 for holding the label L in position.

As the mold sections close, the edges 28 of the mold sections abut and cut off the flow of air through the orifices 27 as shown in FIG. 6. The edge E of each label L is thereby positioned so that it is in underlying relationship to the adjacent edge F of the opposite label L. As the parison P is blown outwardly into conformity with a cavity of the mold as defined by the sections, the heat of the thermoplastic material softens the label or adhesive on the label L causing the label L to be adhered or bonded to the article that has been blown.

In accordance with the invention, the label L is preferably made of an extensible paper such as porous kraft paper coated with an adhesive such as gel lacquer which becomes soft and tacky at the blowing temperature which in the case of the thermoplastic material such as high density polyethylene requires that the adhesive become soft and tacky at 170°–180°.

Figure 11:
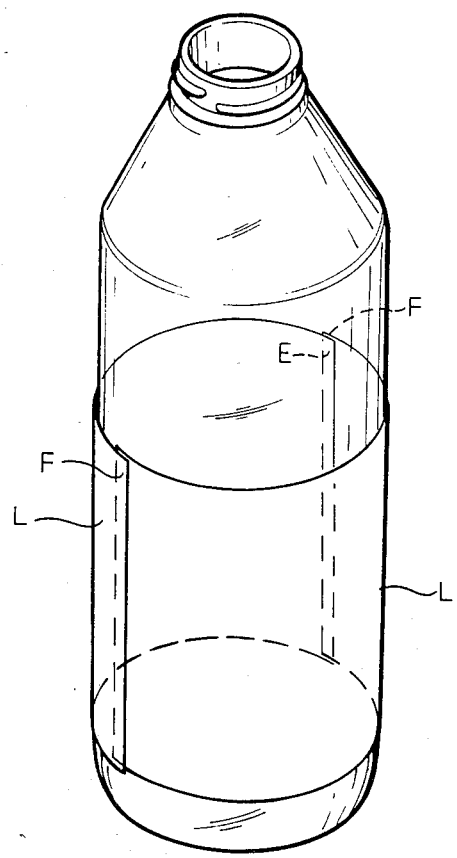
FIG. 11 is a perspective view of a blown article embodying the invention.

As shown in FIG. 11, the resultant article C comprises a continuous label formed by the overlapping edges E, F of the two labels.

Figure 8:
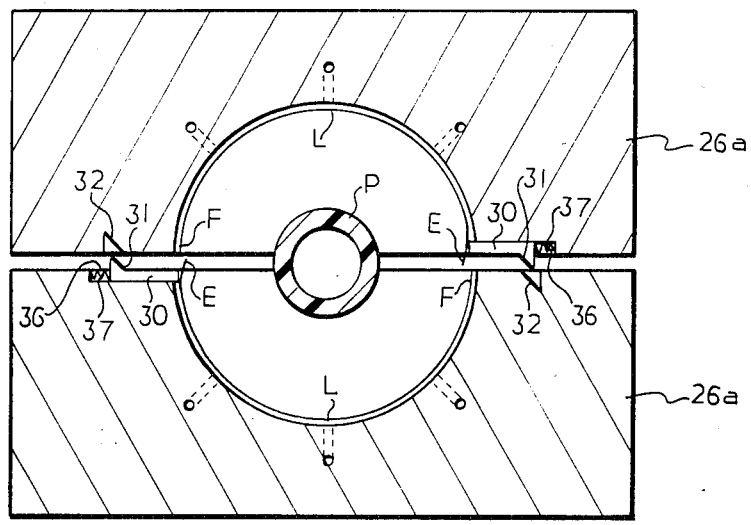
FIG. 8 is a transverse sectional view of a modified form of mold.
Figure 9:
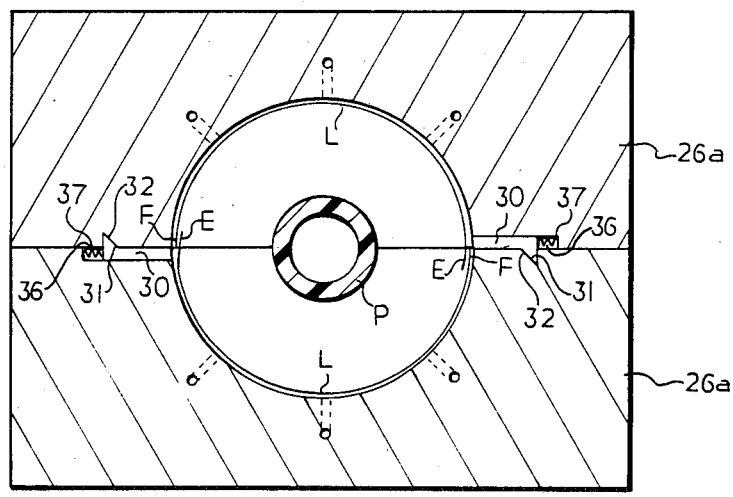
FIG. 9 is a view similar to FIG. 8 showing the mold in closed position.
Figure 10:
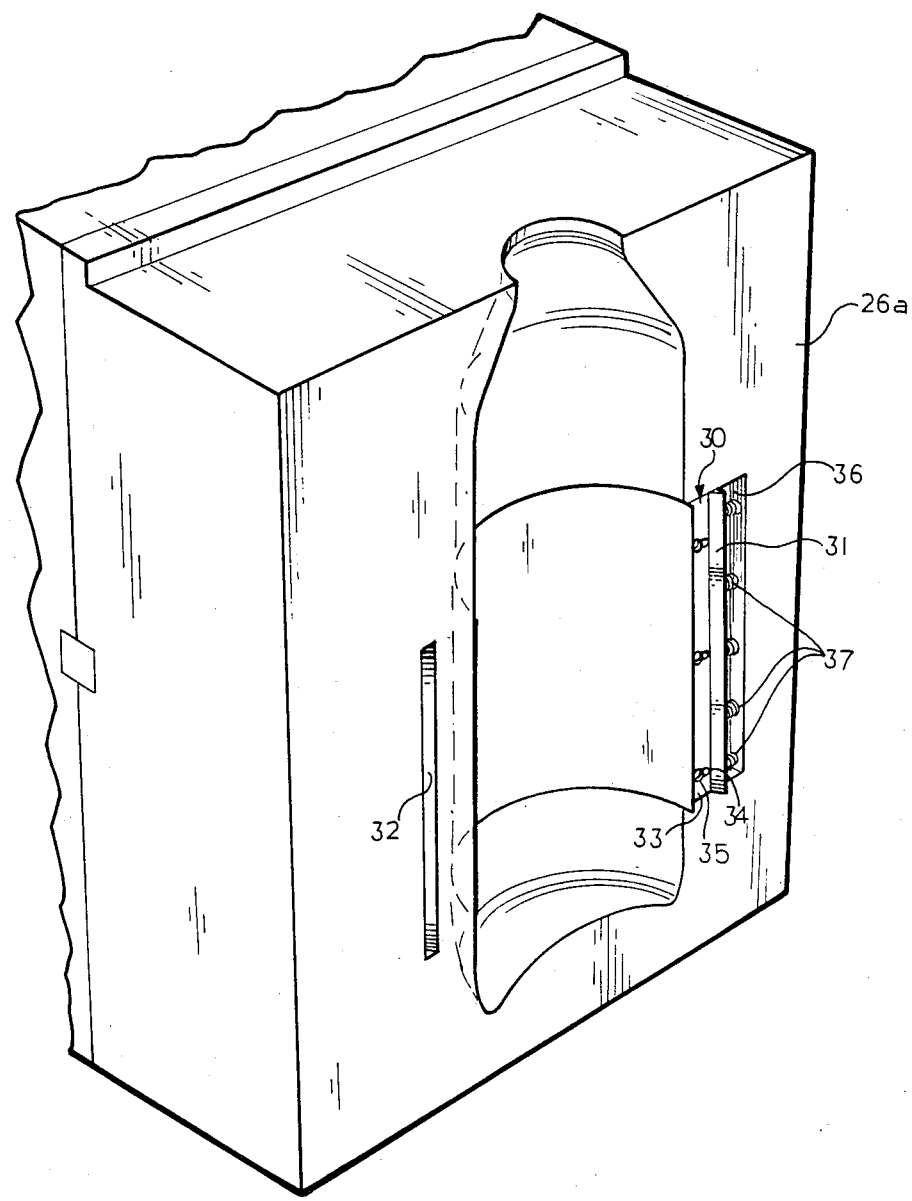
FIG. 10 is a perspective view of a section of the modified form of mold.

In the modified form of apparatus as shown in FIGS. 8–10, the edges E of the labels L which extend beyond the cavities of the mold sections are mechanically forced outwardly by spring loaded plungers 30 which when the mold sections 26a are open hold the edges E radially inwardly. The plungers 30 include cam surfaces 31 that engage an opposed cam surface 32 in a groove in the opposite mold section 26a when the mold sections 26a are closed to withdraw the plunger 30 out of contact with the edges E as shown in FIG. 9. Each plunger 30 comprises an elongated plate 33 having elongated openings 34 through which screws 35 extend to hold the plunger 30 in a recess 36 in the mold section 26a. A plurality of springs 37 yieldingly urge the plunger radially inwardly. The cam surface 31 in the groove extends longitudinally as shown in FIG. 10.

Figure 12:
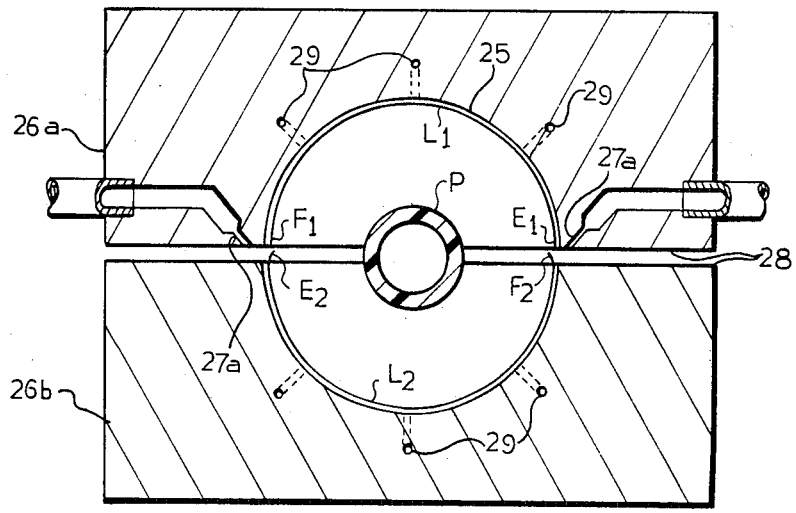
FIG. 12 is a sectional view similar to FIG. 5 of a modified form of apparatus.

Although it is preferred that both labels have the same length so that one edge of each label extends beyond the confines of the cavity, labels of unequal lengths can be used as shown in FIG. 12. One label $L_1$ would have a length such that the edges $E_1$, $F_1$ do not extend beyond the confines of the cavity of mold section 26a and the other label $L_2$ has both edges $E_2$, $F_2$ extending beyond the confines of the cavity of mold section 26b. In such an arrangement, the deflecting means 27a would be positioned on the same mold section 26a.

I claim:

1. In an apparatus for forming and labeling a container which comprises means for blowing a parison outwardly into conformity with a cavity defined by a sectional mold, the apparatus further including
   means for supporting a label in each section of the mold,
   each label having a relative width circumferentially such that an edge thereof extends beyond the side edge of the cavity forming portion of the mold section,
   and means for deflecting said edges which extend beyond the side edges as the sections of the mold close such that when the sections of the mold close, the deflected edges will be in underlying relationship with an adjacent edge of an adjacent label to form a continuous label about the container after the parison has been blown.

2. The apparatus set forth in claim 1 wherein said means for deflecting the edges comprises means for directing gaseous fluid at the edges.

3. The apparatus set forth in claim 2 wherein said last-mentioned means comprises a plurality of jets directed generally radially at an acute angle of the periphery of the portion of the cavity defined by the mold.

4. The apparatus set forth in claim 1 wherein said means for deflecting each edge comprises a member movable radially inwardly on said mold section for engagement with the edge.

5. The apparatus set forth in claim 4 wherein said member is spring loaded to yieldingly move said member radially inwardly.

6. The apparatus set forth in claim 5 including means interengaging said member and operable upon closing of the mold to retract said member.

7. The apparatus set forth in, claim 6 wherein said interengaging means comprises interengaging cam surfaces on said member and said mold section.

8. The apparatus set forth in claim 7 wherein said cam surface on said mold section comprises a surface of a groove.

9. The apparatus set forth in claim 1 wherein said side edges which extend beyond the side edges of the cavity are on the same label, said means for deflecting said side edges being on the same section of the mold.

10. The apparatus set forth in claim 9 wherein said means for deflecting the edge comprises means on said section for directing gaseous fluid at the edge.

11. The apparatus set forth in claim 10 wherein said last-mentioned means comprise two sets of jets, each set comprising a plurality of jets directed generally radially at an acute angle of the periphery of the portion of the cavity defined by the section.

12. The apparatus set forth in claim 9 wherein said means for deflecting each edge of the label comprises a member movable radially inwardly on said mold section for engagement with the edge.

13. The apparatus set forth in claim 12 wherein each said member is spring loaded to yieldingly move the plate radially inwardly.

14. The apparatus set forth in claim 13 including means interengaging said plate and operable upon closing of the mold to retract said plate.

15. The apparatus set forth in claim 14 wherein said interengaging means comprises interengaging cam surfaces on said member and said mold section.

16. The apparatus set forth in claim 15 wherein said cam surface on said mold section comprises a surface of a groove.

* * * * *